United States Patent [19]

Knuth et al.

[11] Patent Number: 5,406,618
[45] Date of Patent: Apr. 11, 1995

[54] VOICE ACTIVATED, HANDSFREE TELEPHONE ANSWERING DEVICE

[75] Inventors: Stephen B. Knuth, Mission Viejo; James W. Mazzolini, Hawthorne; Pierluigi Pacciardi, Montebello, all of Calif.

[73] Assignee: PhoneMate, Inc., Torrance, Calif.

[21] Appl. No.: 956,786

[22] Filed: Oct. 5, 1992

[51] Int. Cl.⁶ ............................................. H04M 1/65
[52] U.S. Cl. ....................................... 379/67; 379/88; 379/374
[58] Field of Search ........................ 379/67, 60, 61, 88, 379/89, 80, 70, 214, 215, 217, 373, 374, 376, 217, 74, 110, 457, 74, 375; 395/2.79, 2.81, 2.83; 369/50; 381/110

[56] References Cited

U.S. PATENT DOCUMENTS

| | | | |
|---|---|---|---|
| 3,742,143 | 6/1973 | Awipi | 179/1 SA |
| 4,472,617 | 9/1984 | Ueda et al. | 367/193 |
| 4,520,576 | 6/1985 | Vander Molen | 34/45 |
| 4,731,811 | 3/1988 | Dubus | 379/58 |
| 4,802,203 | 1/1989 | Muller et al. | 379/80 |
| 4,856,053 | 8/1989 | Hashimoto | 379/96 |
| 4,932,050 | 5/1990 | Davidson et al. | 379/211 |
| 4,939,772 | 7/1990 | Goto | 379/67 |
| 4,945,570 | 7/1990 | Gerson et al. | 381/110 |
| 4,995,074 | 2/1991 | Goldman et al. | 379/97 |
| 5,086,385 | 2/1992 | Launey et al. | 364/188 |
| 5,267,299 | 11/1993 | Nomura | 379/88 |

FOREIGN PATENT DOCUMENTS

| | | | |
|---|---|---|---|
| 0050151 | 3/1988 | Japan | 379/214 |
| 4239851 | 8/1992 | Japan | 379/67 |
| 5037609 | 2/1993 | Japan | 379/67 |

Primary Examiner—James L. Dwyer
Assistant Examiner—Scott L. Weaver
Attorney, Agent, or Firm—Frishauf, Holtz, Goodman & Woodward

[57] ABSTRACT

A telephone answering device that is activated by a proximity sensor when a user crosses its field of detection and whose operation is controlled by simple voice commands. The device incorporates speaker-independent voice recognition circuitry to respond to spoken commands of the user that are elicited by a system generated voice request menu. The telephone answering device performs all the basic functions of a telephone answering machine in response to these simple commands and there is no need for the user to manually operate the telephone answering device.

31 Claims, 2 Drawing Sheets

VOICE ACTIVATED, HANDSFREE TELEPHONE ANSWERING DEVICE

BACKGROUND

When telephone answering devices (TAD's) were first introduced, the controls for operating them closely resembled those of the conventional audio tape recorders of that day. For example, the user was required to press a mechanical lever to place the device in the ANSWER mode, sometimes simultaneously with the depression of the PLAY lever. In order to listen to the recorded incoming messages left by callers, the user had to first terminate recording by pressing the STOP lever and then activate the REWIND lever in order to return the tape to the beginning. If the telephone answering device was equipped with an AUTO STOP feature the user would then press the play lever to put the unit into the PLAY BACK mode so that the incoming messages could be heard, otherwise the STOP lever would have to be pressed first.

Obviously, this control mechanism proved to be cumbersome and it was replaced by the electronic push button type switches or "soft-touch controls", that somewhat enhanced the ease of operation. However, the basic record-rewind-play-stop-erase-record button pushing sequence remained unchanged.

It was not until the advent of "One-Touch Control" telephone answering devices, first pioneered by Phone-Mate, that any significant user enhancement occurred. The controls were designed primarily from a telephone answering device stand point, rather than a tape recorder. With these devices, the user could rewind, listen to the recorded message, rewind again, and reset the unit for recording subsequent calls—all by activating a single button.

The prior art discloses the use of voice recognition circuits for the control of various kitchen utensils and other electronic devices. In the patent to Ueda, U.S. Pat. No. 4,472,617, a voice recognition circuit is disclosed being used for the operation of a microwave oven. In the patent to VanderMolen, U.S. Pat. No. 4,520,576, voice recognition and voice synthesis circuits are disclosed being used for home appliances, such as a clothes dryer. Numerous other voice recognition circuits are well known.

Also, the prior art discloses the use of proximity sensors for activation of an electronic device upon someone entering a room, such as for turning on the lights, or activating a burglar alarm. Such devices include numerous features designed to be activated only in the presence of people, and not animals, or falling objects, so as to avoid false activation of the devices. These proximity sensors operate on a number of different and well known principles, including optical and sonic. Such devices are well known.

Finally, the prior art discloses numerous well known methods of generating human sounding speech, known as speech synthesis for the generation of audible information. For example, such devices are used in the generation of the time information when called by a user to the telephone company.

SUMMARY OF THE INVENTION

The present invention permits completely handsfree and user-friendly operation of a telephone answering device with "NO TOUCH CONTROL". The present invention uses proximity sensor circuitry for initial activation of the telephone answering device and voice synthesis and voice recognition circuitry to interact with the user to simply and efficiently control the operation of a telephone answering device. The present invention provides such an enhanced level of simplicity and user friendliness, that it becomes almost effortless to use a telephone answering device. The telephone answering device of the present invention detects the user's presence as the user enters the room, and having detected the user's presence, informs the user if and only if there were any incoming messages waiting to be heard. The user can verbally, by voice command, tell the telephone answering device to play, repeat, save or erase the incoming messages, without ever touching, or even looking at the telephone answering device.

This type of advanced telephone answering device/user interface is achieved by making use of the well known technologies of proximity sensing, speech synthesis and voice recognition. These technologies are each individually well known and have been in use for several years in other applications unrelated to telephone answering devices. The present invention brings these disparate technologies into the realm of telephone answering devices to provide an improved telephone answering device.

OBJECTS OF THE INVENTION

It is an object of the invention to provide a telephone answering device whose operation can be controlled entirely by user generated voice commands.

It is an object of the invention to provide a telephone answering device that is activated by a proximity sensor upon sensing the user's presence within its field of detection.

It is another object of the invention to provide voice synthesis circuitry that announces the presence of messages and prompts the user for further instructions to control the operation of the telephone answering device.

It is a further object of the invention to have a telephone answering device that can have its entire functions controlled by the user by saying just two words—"YES" and "NO".

These and other objects of the present invention will become apparent from the following specification and accompanying drawings.

DETAILED DESCRIPTION OF THE DRAWINGS

Figure 1:
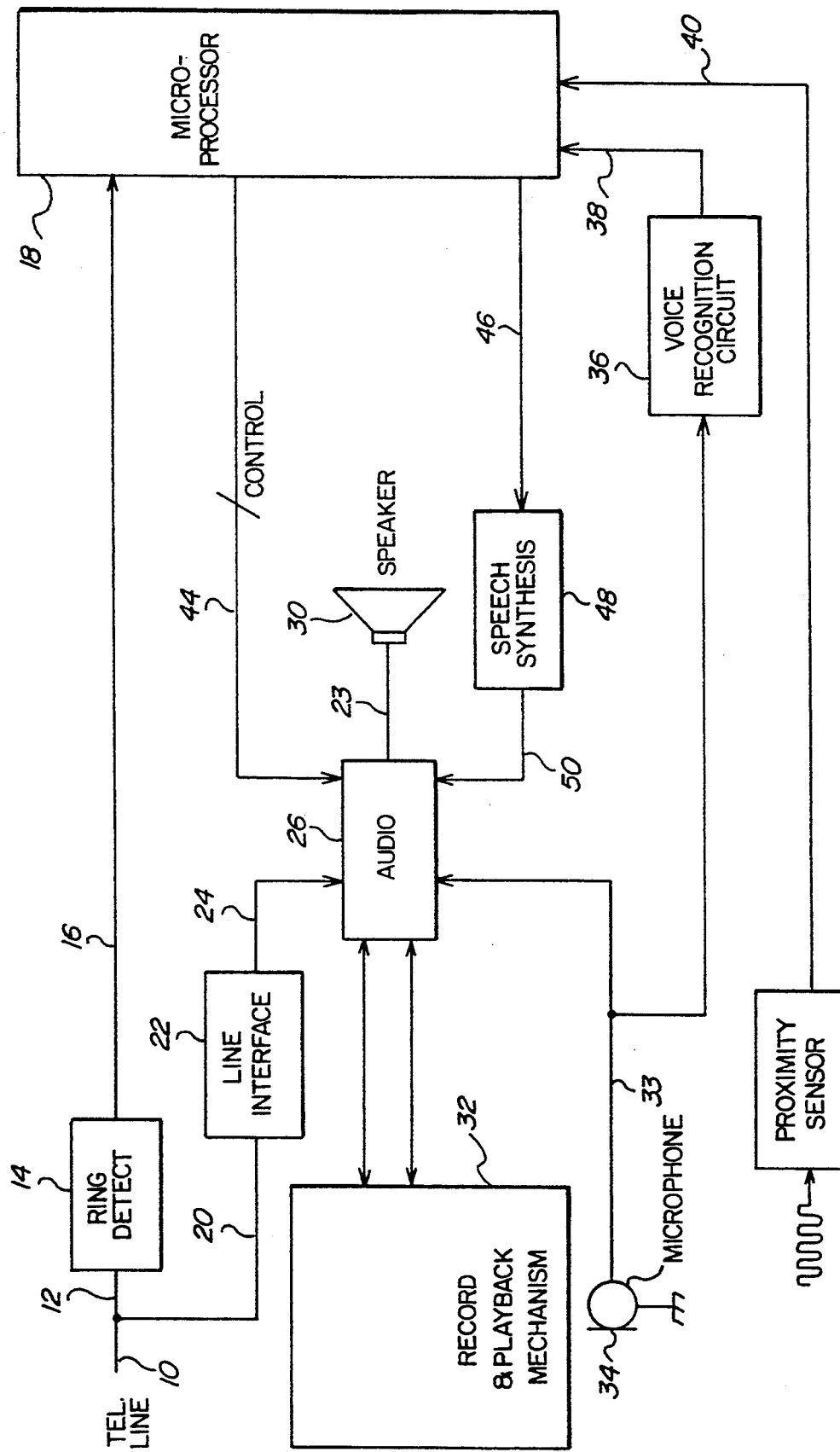
FIG. 1 is a block diagram of the telephone answering device of the present invention.

Referring to FIG. 1 of the drawings, a block diagram of the components of the telephone answering device of the present invention is shown. All of the individual components are well known in the art. The telephone line 10 is connected to the input 12 of the ring detector 14 which has its output 16 connected to the microprocessor 18. The microprocessor is of a conventional design that is well known and responds to its inputs from the various components of the present invention. The telephone line 10 is also connected to the input 20 of a line interface 22 which has its output 24 connected to an audio control circuit 26 connected to a speaker 30.

The record and playback 32 of the telephone answering device is connected to the audio control circuit 26. The record and playback system 32 records the personal outgoing message of the user and records and plays back the incoming messages from callers in the manner of a conventional telephone answering device. The recording medium can be either a tape or digital memory, both of which are well known in the art, or any other desirable recording medium.

The third input onto the audio control circuitry 26 is a microphone pickup 34 for picking up the audible voice commands from the user of the telephone answering device. The output 33 of the microphone pickup 34 is also connected to the voice recognition circuit 36. The voice recognition circuit 36 has its output 38 connected to the microprocessor 18.

The final input 40 into the microprocessor 18 is from a proximity sensor 42. The proximity sensor 42 senses the presence of the user in the manner discussed below. The microprocessor 18 has an output 44 connected to the audio circuit 6 which has its output connected to the speaker 30. The microprocessor 18 also has an output 46 connected to a speech synthesis circuit 48 which has its output 50 connected to the audio control circuit 26.

The proximity sensor 42 may be an optical proximity sensor which employs the use of a photo transistor with the proper amplification and filtering circuitry to detect minute, but relatively rapid changes of the light level in the sensor's field of view and has a typical operating range of 15 ft. Such devices are well known. Alternatively, a passive infrared sensor that detects body heat can also be employed as the proximity sensor 42.

Such proximity sensor devices are commonly used in burglar alarms that need to distinguish between a single random event, such as might be caused by a rodent or small animal passing within the view of the system, and a person. Additional means of preventing the unintentional activation of the telephone answering device may also be incorporated, such as focused beams so that the system is only activated by motion at a certain height above the floor, such as would be the case when the user walks into the room.

Figure 2:
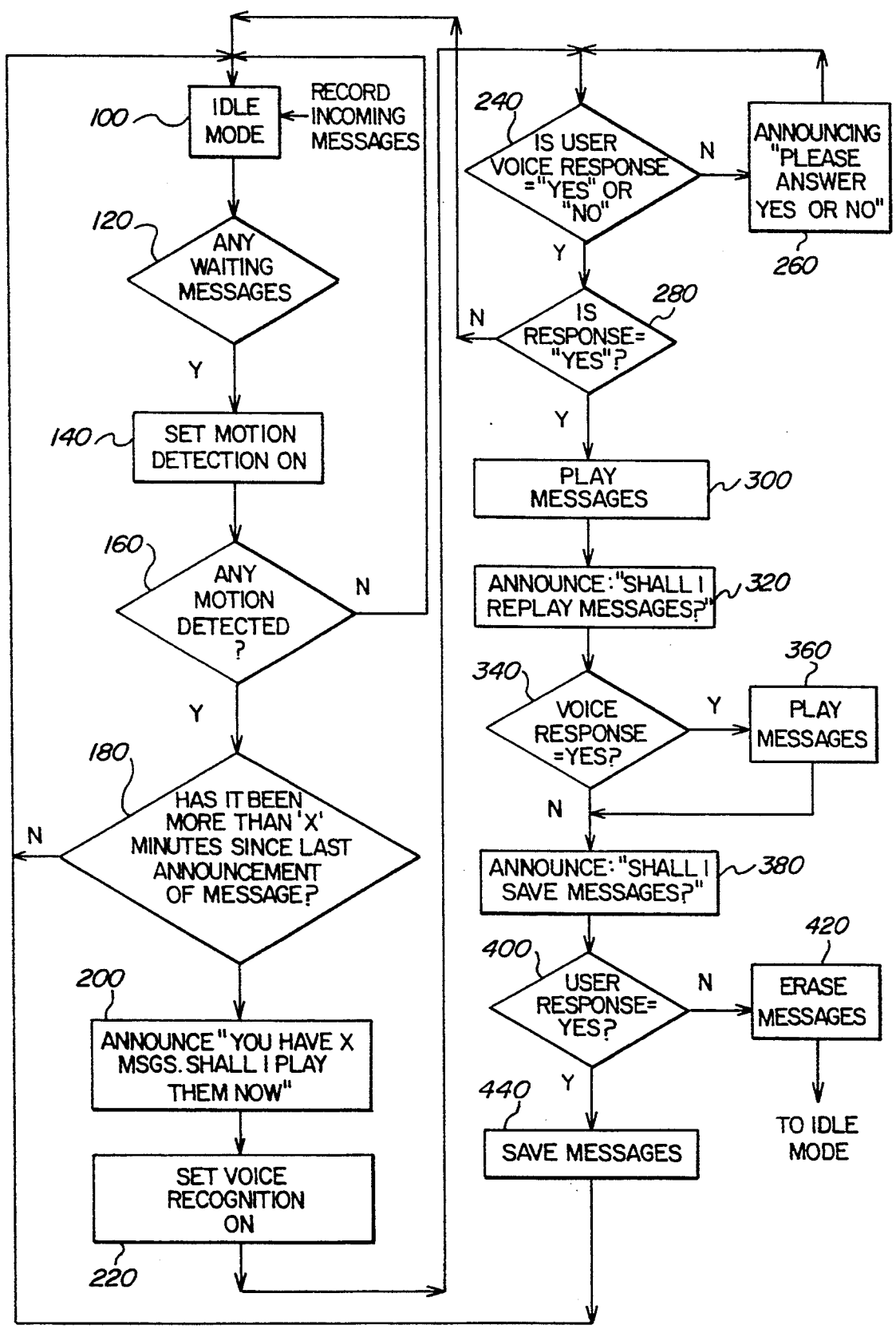
FIG. 2 is a flow chart of the operation of the telephone answering device of the present invention.

Referring to FIG. 2, the operation of the telephone answering device of the present invention is described by reference to a flow chart. Upon arrival of an incoming call, the telephone answering device that is normally in its idle mode 100, plays an outgoing message that was prerecorded on the tape mechanism 32 by the user. After a predetermined number of rings, the TAD prompts the caller to leave a message by transmitting a prerecorded outgoing message to the caller, such as "I am not home. At the sound of the tone, please leave your name and telephone number and I will call you back". If an incoming message has been recorded, the telephone answering device activates the motion detector 42 at 140. If any motion is detected at 160, the telephone answering device checks to see at 180 if at least a selected amount of time (e.g., 15 minutes) has passed since the last announcement of the presence of new messages. This is necessary because it would be annoying to have the announcement repeated every time someone walks across the room. Fifteen minutes is therefore a reasonable amount of time in which to repeat the announcement as a reminder, just in case the user has forgotten his messages.

If the telephone answering device determines that sufficient time has passed since the last announcement, it announces at 200, by means of the speech synthesis circuit 48, the presence of the exact number of messages that are waiting to be played and inquires if the user would like to hear them. The telephone answering device then activates the Voice Recognition circuit 36 at 220 and waits for the user's response at 240. If the user's response is something other than a YES or a NO, the telephone answering device at 260 asks the user to respond by saying either Yes or No. This becomes necessary as people sometimes tend to use certain sounds to indicate a Yes or a No, other than these precise words. If the user's response happens to be No, it could be that he doesn't wish to listen to the incoming messages right away, but will wish to do so at a later time. So the routine is routed to the idle mode 100. As previously described, the routine goes through the steps 120, 140, 160, and 180, where the announcement by the speech synthesis circuit 48 will be repeated after 15 minutes, or some other predetermined time interval if any further motion is detected.

If the user's response is YES at 280, the telephone answering device plays the incoming messages at 300. The telephone answering device replays the messages at 360 if the user answers in the affirmative at 340 to the telephone answering device's question at 320 as to whether the messages are to be replayed. The telephone answering device then proceeds to either save or erase the incoming messages depending on the user's response at 400. The telephone answering device then proceeds to the Idle mode 100, where it waits for new incoming messages.

The following scenario illustrates the operation of the telephone answering device of the present invention:

The user enters his home with a bag of groceries in each arm. He proceeds directly to the kitchen in order to set them down. As he walks in front of the telephone answering device it recognizes the presence of the owner: TAD: "Hello, you have three messages.""Should I play your messages?"Owner: "Yes." (As he begins to put groceries away.) TAD: "I will play your messages."(telephone answering device rewinds and plays the messages as the owner listens, while continuing to put away groceries.) TAD: "This was your last message." (After playing the last message) "Should I play your messages again?"Owner: "NO."TAD: "Should I erase your messages?"Owner: "No." (He may want to hear them later, perhaps to write down a telephone number). TAD: "I will save your messages." (Confirmation).

The user then has the option to return to the telephone answering device later and listen to his messages using normal push button control. He could just as easily have said "YES" to erase the incoming messages and been done for the day.

While the invention has been described with regards to the preferred embodiment it should be appreciated that other variations of the present inventive may be employed without departing from the concept of this invention.

Also while the voice recognition circuitry is instructed to respond to a YES or a NO, it is possible to have the TAD take any word other than a YES instruction as a NO or silence as a NO and proceed accordingly as if the user had said NO. This would prevent the TAD from taking no action in the event that it did not understand the response or if the user was not able to adequately respond.

Also, while an optical proximity sensor is the preferred sensor for the TAD, it is possible to use any number of other conventional motion sensors or detectors to determine the presence of the user in the vicinity of the TAD. For example, sonic sensors may be used which respond to the changes in the reflective wave in order to determine the presence of the user.

In addition, while speech synthesis circuitry is used to provide the information to the user, other means of conveying the information are also possible, such as the use of digital recordings, accessed by the microprocessor. Thus, the questions asked by the TAD and the information such as the number referring to the number of messages could be prerecorded on a recording medium, rather than generating them by speech synthesis.

Additionally, while the timer is set to delay 15 minutes before the telephone answering device asks whether the messages should be played back, the amount of time may be varied.

One major advantage of this unique combination of elements is the robustness which it provides against most sources of false or inadvertent triggering. As an example, the proximity sensor might be triggered by a fluttering curtain or family pet. However, the voice recognition feature, coupled with the time-out feature, will insure that no permanent or irreversible action will be taken by the system resulting in unwanted loss of messages. Even barking of a dog, or the noise of a jet going by, will not result in inadvertent loss of messages.

What I claim is:

1. A telephone answering device comprising:
   record and playback means for recording and playing back an incoming message from a caller;
   a proximity sensor which senses a presence of a user in a vicinity of the telephone answering device and which produces a proximity sensor output signal responsive to sensing the presence of the user in the vicinity of the telephone answering device;
   speech synthesis means for producing an audible sound for at least advising the user of presence of a recorded incoming message;
   voice recognition means responsive to at least one verbal utterance from the user; and
   control means, responsive to both an incoming message having been recorded and the proximity sensor output signal output from the proximity sensor which indicates the presence of the user in the vicinity of the telephone answering device, for controlling the speech synthesis means to produce said audible sound at least advising the user of the presence of the recorded incoming message and for playing back the recorded incoming message in response to an output of said voice recognition means which denotes that the verbal utterance from the user has been recognized.

2. The telephone answering device of claim 1, wherein said proximity sensor comprises an optical sensor.

3. The telephone answering device of claim 1, wherein said proximity sensor comprises an infra-red sensor.

4. The telephone answering device of any one of claims 1, 2 or 3, wherein said control means renders the speech synthesis means inoperative for a given period of time after an initial activation of said speech synthesis means.

5. The telephone answering device of claim 4, wherein said control means includes time delay means for setting said given period of time.

6. The telephone answering device of claim 1, wherein said voice recognition means recognizes the verbal utterance as at least one of verbal utterances corresponding to YES and NO.

7. The telephone answering device of claim 1, wherein said voice recognition means recognizes the verbal utterance as a verbal utterance corresponding to YES only.

8. The telephone answering device of claim 1, wherein said control means includes means for rendering said speech synthesis means inoperative.

9. The telephone answering device of claim 1, wherein said control means, in combination with said voice recognition means, substantially prevents unintended erasure of said recorded incoming message due to false or inadvertent activation of said proximity sensor.

10. The telephone answering device of claim 1, wherein said speech synthesis means includes means for informing the user of a recorded incoming message by sounding synthesized speech through a speaker.

11. The telephone answering device of claim 1 or 10, wherein said speech synthesis means includes means for requesting the user to provide an audible response, corresponding to at least one of YES and NO, to a previously sounded message produced by said speech synthesis means.

12. The telephone answering device of claim 1, further including speaker means for sounding played back recorded incoming messages and for sounding speech synthesized by said speech synthesis means.

13. The telephone answering device of claim 6, wherein said control means further comprises means for activating said speech synthesis means for advising the user to provide an audible response consisting of a verbal utterance corresponding to YES or NO, when said voice recognition means does not recognize the verbal utterance from the user.

14. The telephone answering device of claim 13, wherein said speech synthesis means comprises means for advising the user to provide an audible response corresponding to at least one of YES and NO, to a previously sounded message produced by said speech synthesis means.

15. The telephone answering device of claim 1, wherein said control means further comprises means for activating said speech synthesis means for advising the user to provide an audible response when said voice recognition means does not recognize the verbal utterance from the user.

16. The telephone answering device of claim 4, wherein said voice recognition means recognizes the verbal utterance as at least one of verbal utterances corresponding to YES and NO.

17. The telephone answering device of claim 16, wherein said voice recognition means recognizes at least a verbal utterance corresponding to NO, and wherein said control means renders said speech synthesis means inoperative for a predetermined period of time after said voice recognition means recognizes a verbal utterance corresponding to NO.

18. The telephone answering device of claim 17, wherein said given period of time is said predetermined period of time.

19. The telephone answering device of claim 6, wherein said voice recognition means recognizes at least a verbal utterance corresponding to NO, and wherein said control means renders said speech synthesis means inoperative for a predetermined period of time after said voice recognition means recognizes a verbal utterance corresponding to NO.

20. The telephone answering device of claim 19, wherein said predetermined period of time is controlled by a timer means in said control means.

21. The telephone answering device of claim 9, wherein said means for substantially preventing unintended erasure comprises means for preventing operation of said record and playback means when said voice recognition means does not recognize the audible sound, received after activation of said proximity sensor, as corresponding to YES or NO.

22. The telephone answering device of claim 14, wherein said control means activates said speech synthesis means for advising the user to provide an audible response when said voice recognition means does not recognize the verbal utterance of the user.

23. A method of operating a telephone answering device, said telephone answering device including (a) a record and playback means for recording and playing back an incoming message from a caller; (b) a proximity sensor which senses a presence of a user in a vicinity of the telephone answering device and which produces a proximity sensor output signal responsive to sensing the presence of the user in the vicinity of the telephone answering device; (c) speech synthesis means, responsive to both the recorded incoming message and the proximity sensor output signal, for advising the user of presence of the recorded incoming message; (d) voice recognition means responsive to at least one audible verbal utterance from the user; and (e) control means, responsive to an output of the voice recognition means, for controlling the telephone answering device to play back the recorded incoming message in response to the audible verbal utterance from the user, said method of operating the telephone answering device comprising the steps of:

(1) recording the incoming message in said record and playback means;

(2) said proximity sensor sensing the presence of the user in the vicinity of the telephone answering device;

(3) said voice synthesis means audibly indicating that the incoming message is recorded in said record and playback means;

(4) said voice recognition means recognizing the audible verbal utterance from the user; and (5) said control means controlling the telephone answering device to play back the recorded incoming message responsive to the audible verbal utterance of the user being recognized.

24. The method of claim 23, wherein said step of recognizing the audible verbal utterance from the user comprises recognizing sounds corresponding to at least one of YES and NO.

25. The method of claim 23, further including a step of substantially preventing unintended erasure of said recorded incoming message due to false or inadvertent activation of said proximity sensor.

26. The method of claim 23, wherein said step of recognizing the audible verbal utterance from the user comprises recognizing a sound corresponding to YES only.

27. The method of claim 23, wherein said audibly indicating step comprises audibly indicating to the user a number of incoming messages which have been recorded in said record and playback means to indicate to the user the number of messages recorded.

28. The method of claim 24, further comprising a step of audibly requesting the user to provide an audible response consisting of a sound corresponding to YES or NO, if said step of recognizing the audible verbal utterance has not recognized the audible verbal utterance as YES or NO.

29. The method of claim 23, further comprising a step of audibly requesting the user to provide an audible response when audibly indicating to the user that the incoming message has been recorded.

30. The method of claim 23, further comprising a step of audibly requesting a user to provide an audible response, if the an audible verbal utterance is not recognized in said recognizing step.

31. The method of claim 25, wherein said step of substantially preventing unintended erasure comprises preventing operation of said record and playback means when said recognizing step does not result in recognition of the audible verbal utterance after activation of said proximity sensor.

* * * * *